Patented Apr. 29, 1947

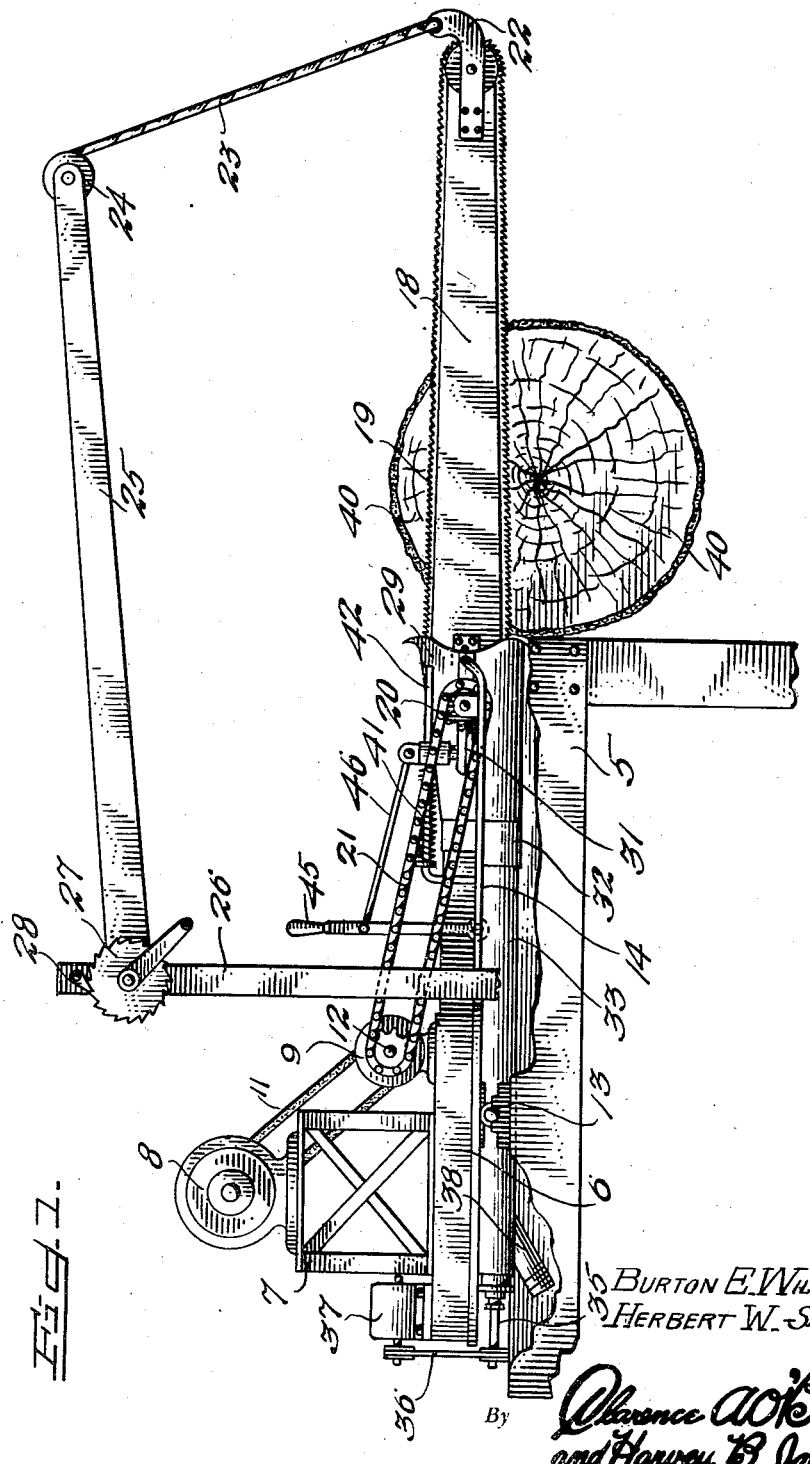

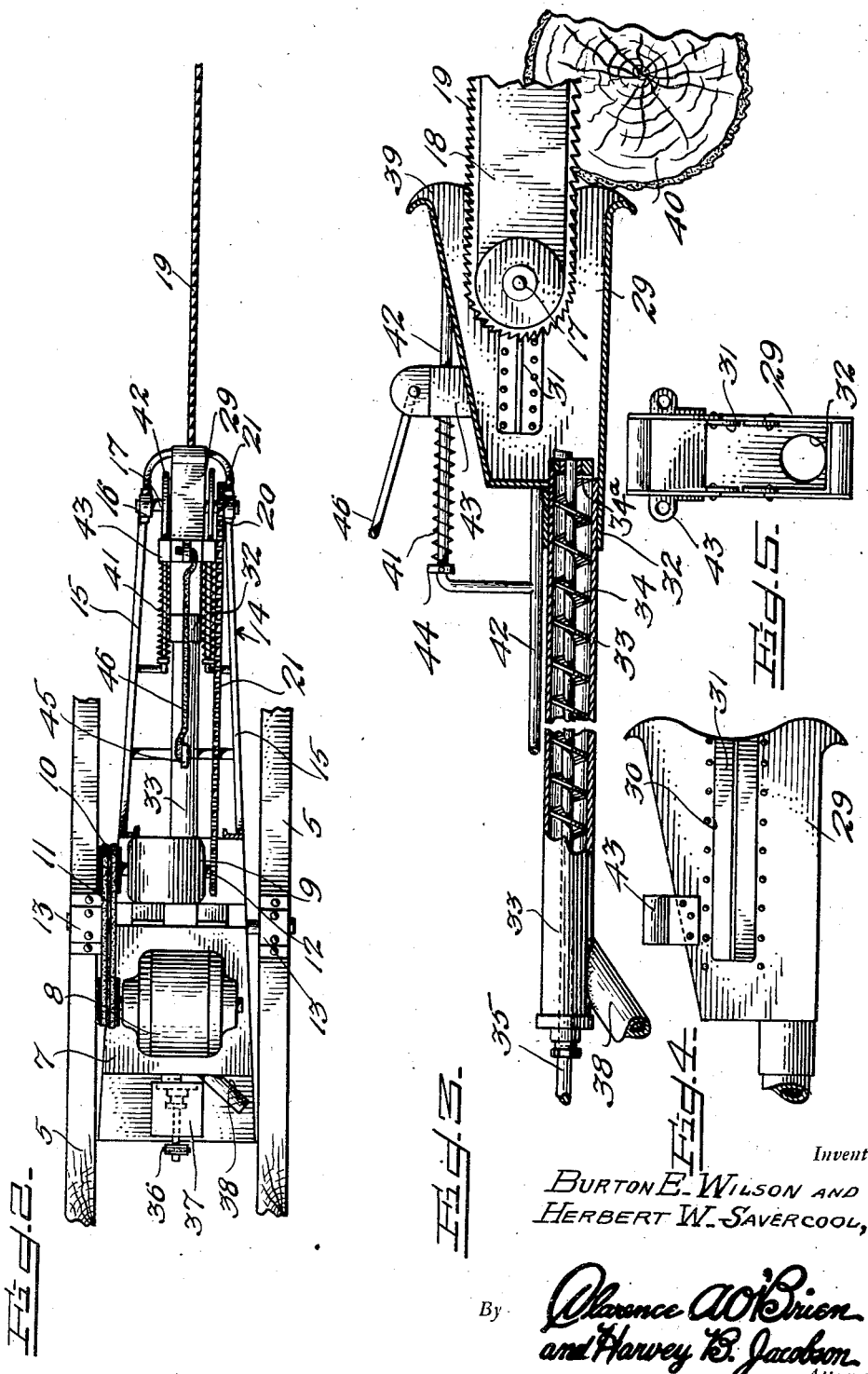

2,419,751

UNITED STATES PATENT OFFICE 2,419,751

LOG SAWING MACHINE

Burton E. Wilson and Herbert W. Savercool, Greenville, Calif.

Application November 9, 1945, Serial No. 627,617

5 Claims. (Cl. 143—32)

The present invention relates to new and useful improvements in log sawing machines and more particularly to a machine of this character for sawing floating logs in a mill pond.

An important object of the present invention is to provide a log sawing machine of this character embodying means for collecting and removing the sawdust during the sawing operation whereby to prevent the sawdust from settling on the bottom of the pond and which would eventually fill the pond.

A further object of the invention is to provide a log sawing machine of this character in which a power driven chain saw is provided and which acts upon the log to hold the same against a work or platform at the edge of the mill pond during the sawing operation.

A still further object of the invention is to provide a sawdust collecting throat member in which the inner end of the saw operates together with means for yieldably holding the throat against the side of the log to compensate for irregularities in the contour of the log.

A still further object of the invention is to provide an apparatus of this character of simple and practical construction, which is efficient and reliable in operation, relatively inexpensive to manufacture and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1 is a side elevational view.

Figure 2 is a top plan view.

Figure 3 is an enlarged longitudinal sectional view through the front end of the sawdust conveyor and sawdust collecting throat attached thereto.

Figure 4 is a side elevational view of the sawdust collecting throat.

Figure 5 is a front elevational view thereof.

Referring now to the drawings in detail wherein for the purpose of illustration I have disclosed a preferred embodiment of the invention, the numeral 5 designates a work, bulkhead or other suitable supporting structure positioned at the edge of a mill pond or other body of water and which forms a platform on which is mounted a base 6 for a stand 7 having an electric motor or other power plant 8 mounted thereon. A reduction gear housing 9 is supported on the base 6 having a shaft 10 journaled therein and projecting from opposite sides of the housing, one end of the shaft being driven by a belt 11 from the motor 8 while a sprocket 12 is secured to the other end of the shaft.

The base 6 is supported on the structure 5 by means of a pillow block or the like 13.

A saw frame 14 projects forwardly from the base 6 and includes longitudinally extending frame members 15 having bearings 16 at the front ends thereof in which a transversely extending shaft 17 is journaled.

A filler plate 18 for a conventional type of chain saw 19 has its rear end pivoted on the shaft 17 and to one end of the shaft 17 is secured a sprocket 20 for driving the saw by means of a chain 21 extending over the sprocket 12. The front end of the filler plate 18 is supported for vertical adjustment by means of a bracket 22 to which a cable 23 is attached which extends upwardly over a pulley 24 at the outer end of a beam 25 supported on posts 26 rising from the base 6.

The cable or rope 23 is wound on a drum (not shown) at the junction of the beam 25 and post 26 and secured against unwinding movement by means of a ratchet 27 and dog 28 in the usual manner.

The rear end of the saw 18 is positioned in a sawdust collecting throat 29 which is open at its front end and tapers toward its rear end, the sides of the throat being formed with horizontally extending slots 30 extending rearwardly from the front edge thereof for sliding the throat forwardly and rearwardly on the shaft 17, the ends of the shaft working in the slots 30. Flexible shields 31 are connected to the upper and lower edges of the slots 30 to substantially close the slots and to prevent sawdust from being discharged through the sides of the throat.

A tubular extension 32 is formed at the rear end of the throat 29 and in which is slidably received the front end of an auger or screw conveyor housing 33 having an auger or screw conveyor 34 operatively mounted therein with a cutter 34a at its front end.

The screw 34 is operated by means of a shaft 35 journaled in the rear end of the housing 33 and driven by means of a belt 36 from an electric motor or other type of power plane 37 mounted on the rear end of the base 6. A rearwardly inclined discharge pipe 38 extends from the rear end of the conveyor housing 33 through which sawdust is discharged from the conveyor for suitable disposal.

The front end of the throat 29 is flared as indicated at 39 and is yieldably held against the side of a log 40 to conform to irregularities in the contour thereof by means of a pair of coil springs 41 mounted on spaced parallel rods 42 positioned at opposite sides of the throat.

A pair of tubular guides 43 rise from the throat 29 in which the rods 42 are slidably received and against which one end of the coil springs 41 abut. The rear ends of the coil springs engage collars 44 secured to the rear portions of the rods 42. Accordingly, the springs 41 exert a forward pressure on the throat 29 to yieldably hold the same against the side of the log.

The throat 29 may be manually moved rearwardly out of engagement with the log by means of a lever 45 pivoted at its lower end on the base 6 and connected to the throat by means of a link 46.

In the operation of the device the log 41 is floated against the front edge of the supporting structure and the saw 19 lowered into position for cutting the log into desired length. The throat 29 is projected forwardly by the springs 41 against the log and the log is urged against the throat by the cutting action of the saw. During the operation of the saw the sawdust is drawn rearwardly into the throat and is conveyed from the rear portion of the throat away from the pond by means of the screw conveyor 34.

What is claimed is:

1. A saw machine comprising in combination a supporting structure positioned at the edge of a body of water on which a log to be sawed is floated, a power driven saw mounted on the structure and operated in a manner to draw the log against the structure, and means mounted on the structure at the inner end of the saw to collect and remove sawdust produced during the sawing action.

2. A saw machine comprising in combination a supporting structure positioned at the edge of a body of water on which a log to be sawed is floated, a power driven saw mounted on the structure and operated in a manner to draw the log against the structure, and a sawdust conveyor at the inner end of the saw arranged to remove sawdust from the region of the log.

3. A saw machine comprising in combination a supporting structure positioned at the edge of a body of water on which a log to be sawed is floated, a power driven saw mounted on the structure and operated in a manner to draw the log against the structure, a sawdust collecting throat at the inner end of the saw, and a conveyor for the sawdust connected to the throat.

4. A saw machine comprising in combination a supporting structure positioned at the edge of a body of water on which a log to be sawed is floated, a power driven saw mounted on the structure and operated in a manner to draw the log against the structure, a slidably mounted sawdust collecting throat at the inner end of the saw, yieldable means urging the throat against the log, and a conveyor for the sawdust connected to the throat.

5. A saw machine comprising in combination a supporting structure positioned at the edge of a body of water on which a log to be sawed is floated, a power driven saw mounted on the structure and operated in a manner to draw the log against the structure, a slidably mounted sawdust collecting throat at the inner end of the saw, yieldable means urging the throat against the log, and an auger type conveyor connected to the throat for removing sawdust collected in the throat.

BURTON E. WILSON.
HERBERT W. SAVERCOOL.

REFERENCES CITED

The following references are of record in the file of this patent:

UNITED STATES PATENTS

| Number | Name | Date |
| --- | --- | --- |
| 951,510 | Muir | Mar. 8, 1910 |
| 1,725,495 | Vogler | Aug. 20, 1929 |
| 189,864 | Knight | Apr. 24, 1877 |
| Re. 20,687 | Grozier | Apr. 5, 1938 |